United States Patent
Lin (10) Patent No.: US 11,564,542 B2
(45) Date of Patent: Jan. 31, 2023

(54) DISASSEMBLY MECHANISM AND DUST COLLECTOR INCLUDING THE SAME

(71) Applicant: CHANG TJER MACHINERY CO., LTD., Taichung (TW)

(72) Inventor: Yu-Tse Lin, Taichung (TW)

(73) Assignee: CHANG TJER MACHINERY CO., LTD., Taichung (TW)

( * ) Notice: Subject to any disclaimer, the term of this patent is extended or adjusted under 35 U.S.C. 154(b) by 265 days.

(21) Appl. No.: 17/124,900

(22) Filed: Dec. 17, 2020

(65) Prior Publication Data

US 2021/0186284 A1 Jun. 24, 2021

(30) Foreign Application Priority Data

Dec. 20, 2019 (TW) ................................ 108146930

(51) Int. Cl.
| | | |
|---|---|---|
| *A47L 9/10* | (2006.01) | |
| *A47L 9/14* | (2006.01) | |
| *B23Q 11/00* | (2006.01) | |
| *B24B 55/06* | (2006.01) | |

(52) U.S. Cl.
CPC ............. *A47L 9/106* (2013.01); *A47L 9/1409* (2013.01); *B23Q 11/0057* (2013.01); *B24B 55/06* (2013.01)

(58) Field of Classification Search
CPC ... A47L 9/106; A47L 9/1409; B23Q 11/0057; B24B 55/06
See application file for complete search history.

(56) References Cited

U.S. PATENT DOCUMENTS

| | | | | |
|---|---|---|---|---|
| 4,650,200 A | * | 3/1987 | Berfield | B62B 3/104 248/154 |
| 5,089,037 A | * | 2/1992 | Marsolais | A47L 5/36 55/357 |
| 5,882,379 A | * | 3/1999 | Johnson | B01D 46/446 96/405 |
| 6,833,016 B2 | * | 12/2004 | Witter | B24B 7/18 55/346 |
| 7,044,991 B2 | * | 5/2006 | Wang | B01D 46/66 55/366 |
| 7,282,074 B1 | * | 10/2007 | Witter | B24B 55/06 451/87 |
| 7,824,457 B2 | * | 11/2010 | Witter | B23D 59/006 210/512.1 |
| D651,776 S | * | 1/2012 | Cheng | D32/21 |
| 8,147,580 B2 | * | 4/2012 | Lin | B03C 3/88 55/428 |

(Continued)

*Primary Examiner* — Dung H Bui
(74) *Attorney, Agent, or Firm* — Muncy, Geissler, Olds & Lowe, P.C.

(57) ABSTRACT

A disassembly mechanism configured to be disposed on a dust collector is provided, including: a fixation assembly, including a first fixation portion and a second fixation portion, the first and second fixation portions being configured to be disposed on a base and a barrel of the dust collector respectively, the second fixation portion including a slot; an actuating mechanism, including an engaging portion being disengageably engaged laterally with the slot and a connecting portion being movably disposed on the first fixation portion, and the engaging portion being movable with the second fixation portion. A dust collector including at least one aforementioned disassembly mechanism is also provided.

2 Claims, 9 Drawing Sheets

(56) References Cited

U.S. PATENT DOCUMENTS

| | | | | |
|---|---|---|---|---|
| 8,393,050 B2* | 3/2013 | Witter | ............... | B01D 46/2411 |
| | | | | 15/353 |
| D690,064 S * | 9/2013 | Witter | ........................... | D32/21 |
| 8,695,158 B2* | 4/2014 | Cheng | ................... | B01D 46/42 |
| | | | | 55/357 |
| D741,985 S * | 10/2015 | Ma | .............................. | D23/365 |
| 10,265,652 B1* | 4/2019 | Cheng | ................... | F16B 2/185 |
| 2008/0016830 A1* | 1/2008 | Witter | ................... | B01D 45/12 |
| | | | | 55/337 |
| 2011/0203238 A1* | 8/2011 | Witter | ................... | B01D 46/42 |
| | | | | 55/356 |
| 2018/0169558 A1* | 6/2018 | Cheng | ................ | B01D 46/681 |

* cited by examiner

DISASSEMBLY MECHANISM AND DUST COLLECTOR INCLUDING THE SAME

BACKGROUND OF THE INVENTION

Field of the Invention

The present invention relates to a disassembly mechanism and a dust collector including the same.

Description of the Prior Art

Generally, in the working environment of wood or metal grinding or processing, a large amount of dust and particles are generated, which causes pollution and do harms to the operator health. Therefore, a dust collection and filtration equipment such as dust collectors is usually provided in such workplaces, for cleaning and collecting the dust and particles.

The conventional dust collector mainly includes a dust collecting box whose front section is provided with a fan driven by an external motor, and a retractable pipe member is connected to the bottom of the front section of the dust collecting box and connected to a dust collecting barrel. The dust collecting barrel includes a separable cover, the separable cover is connected with the retractable pipe member to be integral, and the separable cover and the dust collecting barrel are fastened and positioned with each other with a buckle or fastening member. This type of conventional structure must include the retractable pipe member, it has to move the cover to elongate or shorten the retractable pipe member in order to cover the dust collecting barrel well, and the cover should be then tightened with the dust collecting barrel, which results in slow assembling/disassembling, unreliable combination/sealing, short service life and high production cost.

The present invention is, therefore, arisen to obviate or at least mitigate the above-mentioned disadvantages.

SUMMARY OF THE INVENTION

The main object of the present invention is to provide a disassembly mechanism and a dust collector including the same, which provides quick assembling, quick disassembling, positioning and closing.

To achieve the above and other objects, a disassembly mechanism configured to be disposed on a dust collector is provided. The dust collector includes a main body, a barrel and a base, the main body includes a suction device and a cover, the suction device is configured to suck air into the main body, the cover is configured to close the barrel and be in communication with the main body, and the barrel and the cover are arranged on a first direction. The disassembly mechanism includes: a fixation assembly, including a first fixation portion and a second fixation portion, one of the first fixation portion and the second fixation portion being configured to be disposed on the base, the other of the first fixation portion and the second fixation portion being configured to be disposed on the barrel, the second fixation portion including a slot which is open laterally; an actuating mechanism, including an engaging portion and a connecting portion connected with the engaging portion, the engaging portion being disengageably engaged laterally with the slot, the connecting portion being movably disposed on the first fixation portion so that the engaging portion is movable with the second fixation portion in the first direction.

To achieve the above and other objects, a dust collector is further provided, including two said disassembly mechanisms of claim 1, further including: a base, including two posts arranged in interval, each said post extending in the first direction; a main body, the two posts being connected to two opposite sides of the main body, the main body including a suction device and a cover, the suction device being configured to suck air into the main body; a barrel, the barrel and the cover being arranged on the first direction, the cover being configured to close the barrel and be in communication with the main body; wherein the two said disassembly mechanisms are located at two opposite sides of the barrel, each said first fixation portion being disengageably connected to one said post.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
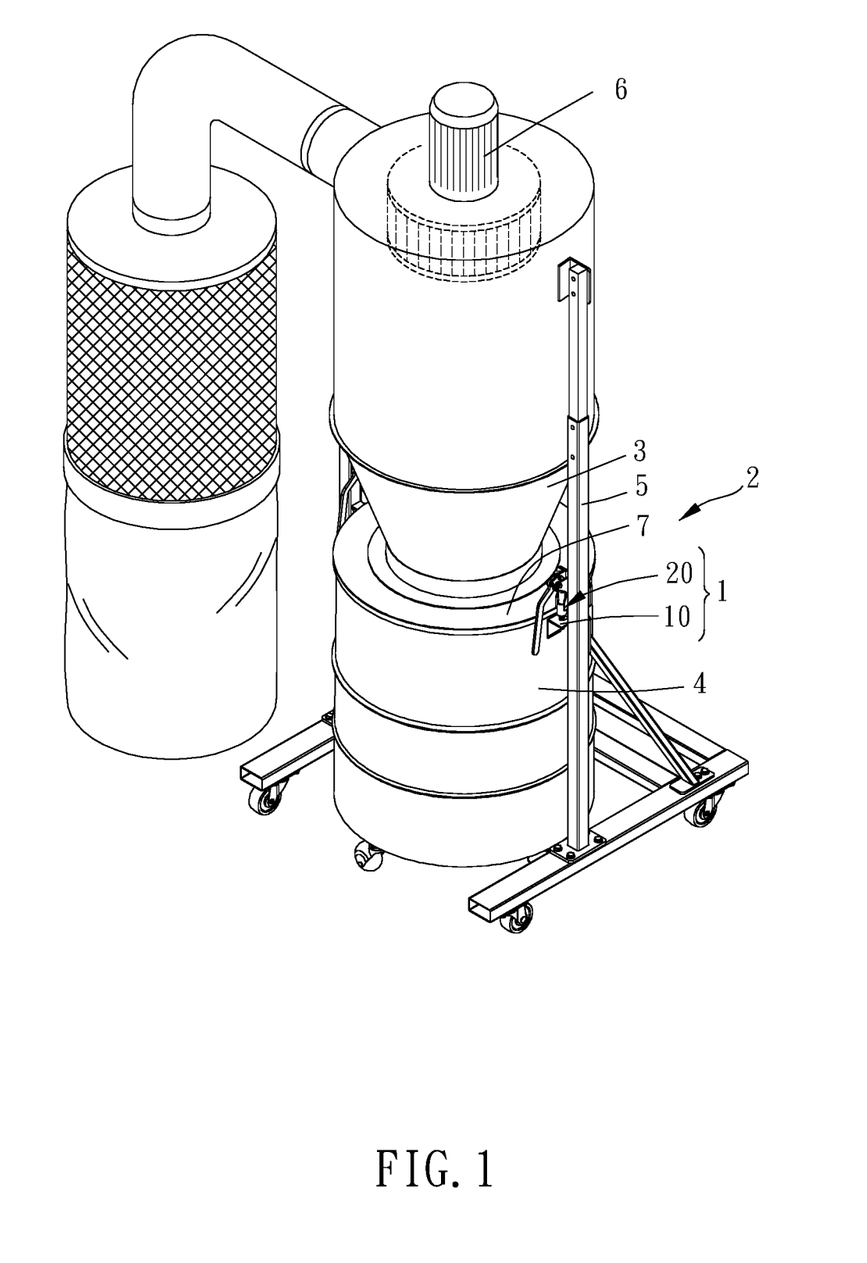
FIG. 1 is a stereogram of a preferable embodiment of the present invention.
Figure 2:
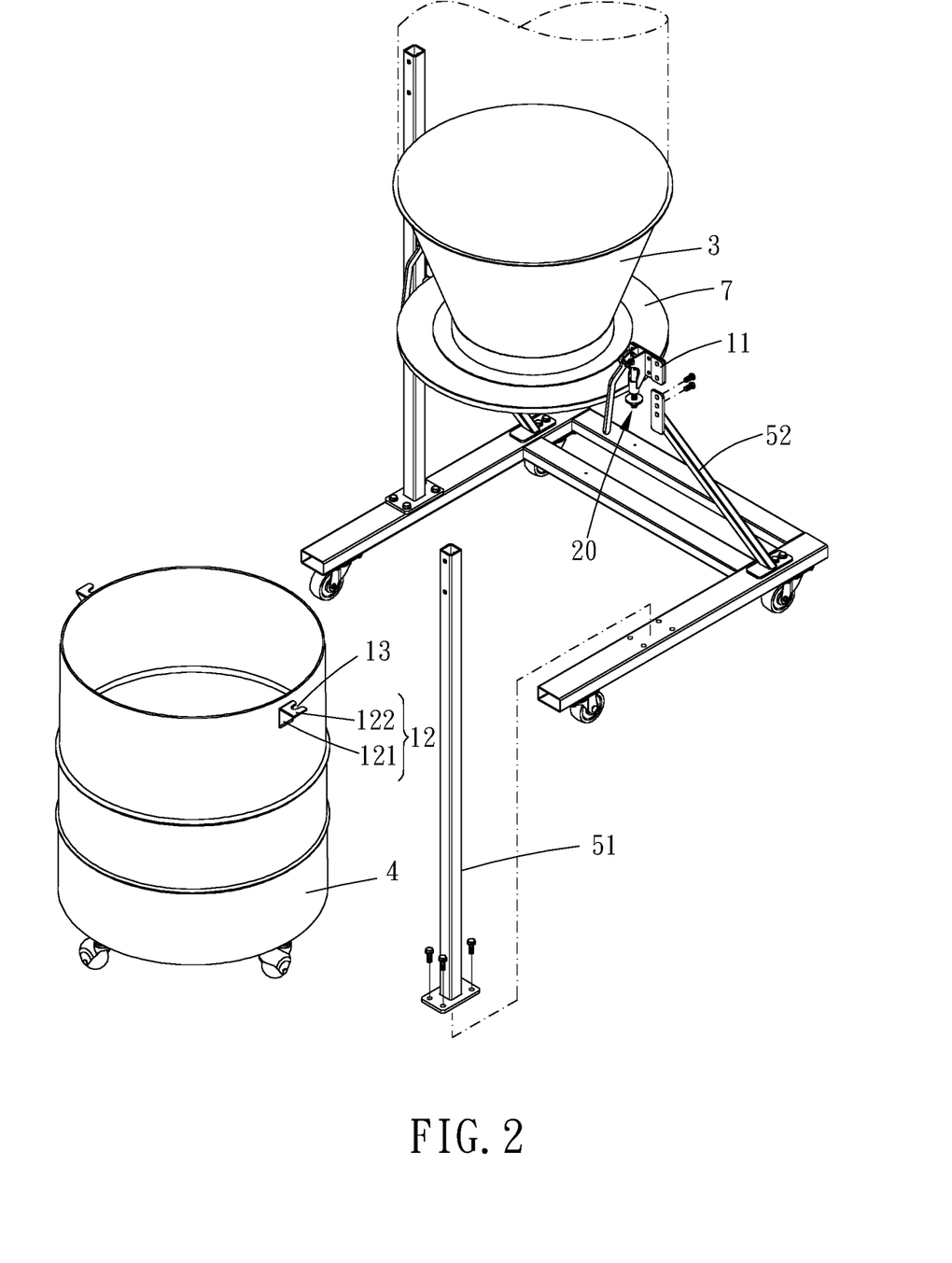
FIG. 2 is a breakdown drawing of a preferable embodiment of the present invention.
Figure 3:
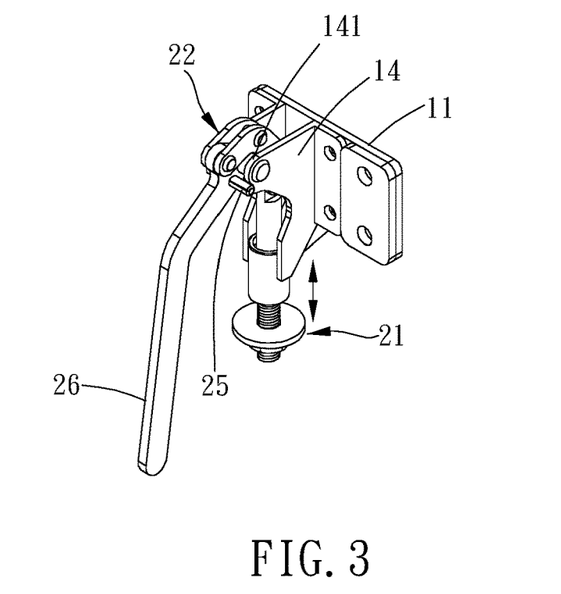
FIG. 3 is a stereogram of an actuating mechanism according to a preferable embodiment of the present invention.
Figure 4:
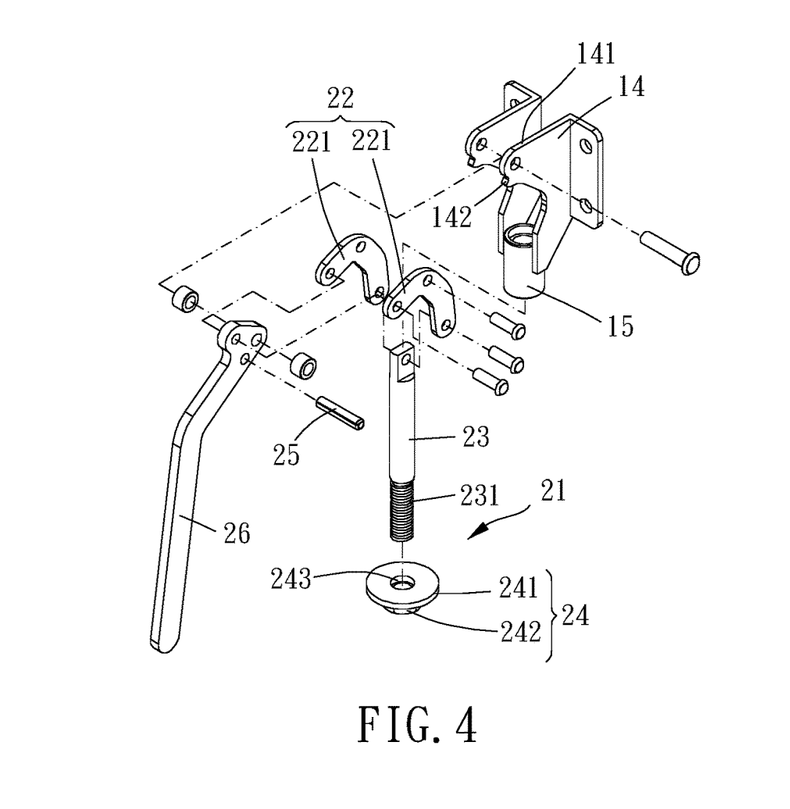
FIG. 4 is a breakdown drawing of the actuating mechanism according to a preferable embodiment of the present invention.
Figure 5:
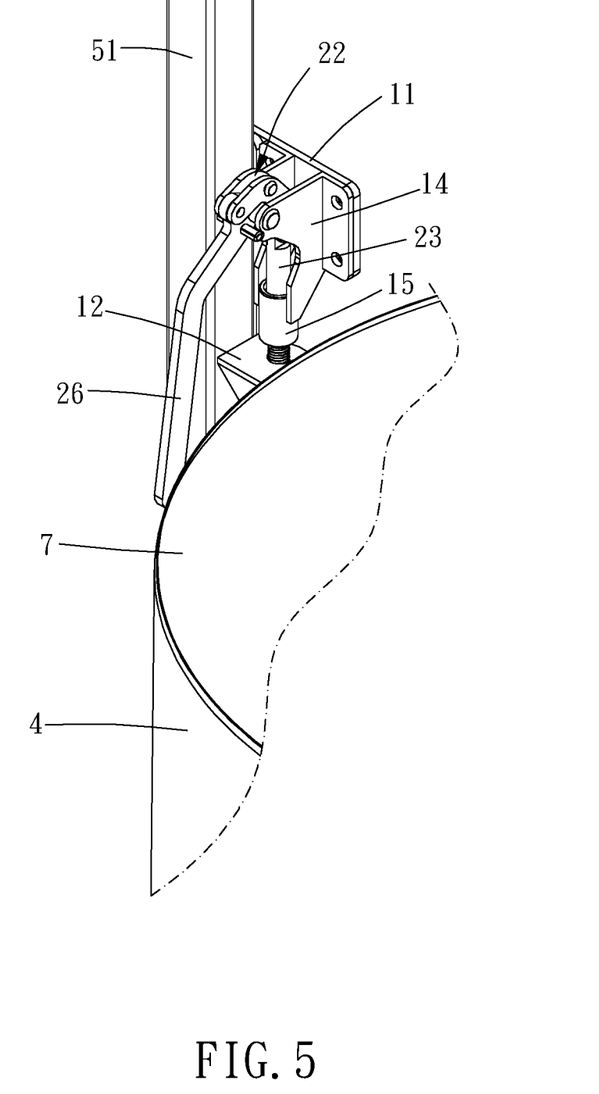
FIG. 5 is a partial view of a preferable embodiment of the present invention.
Figure 6:
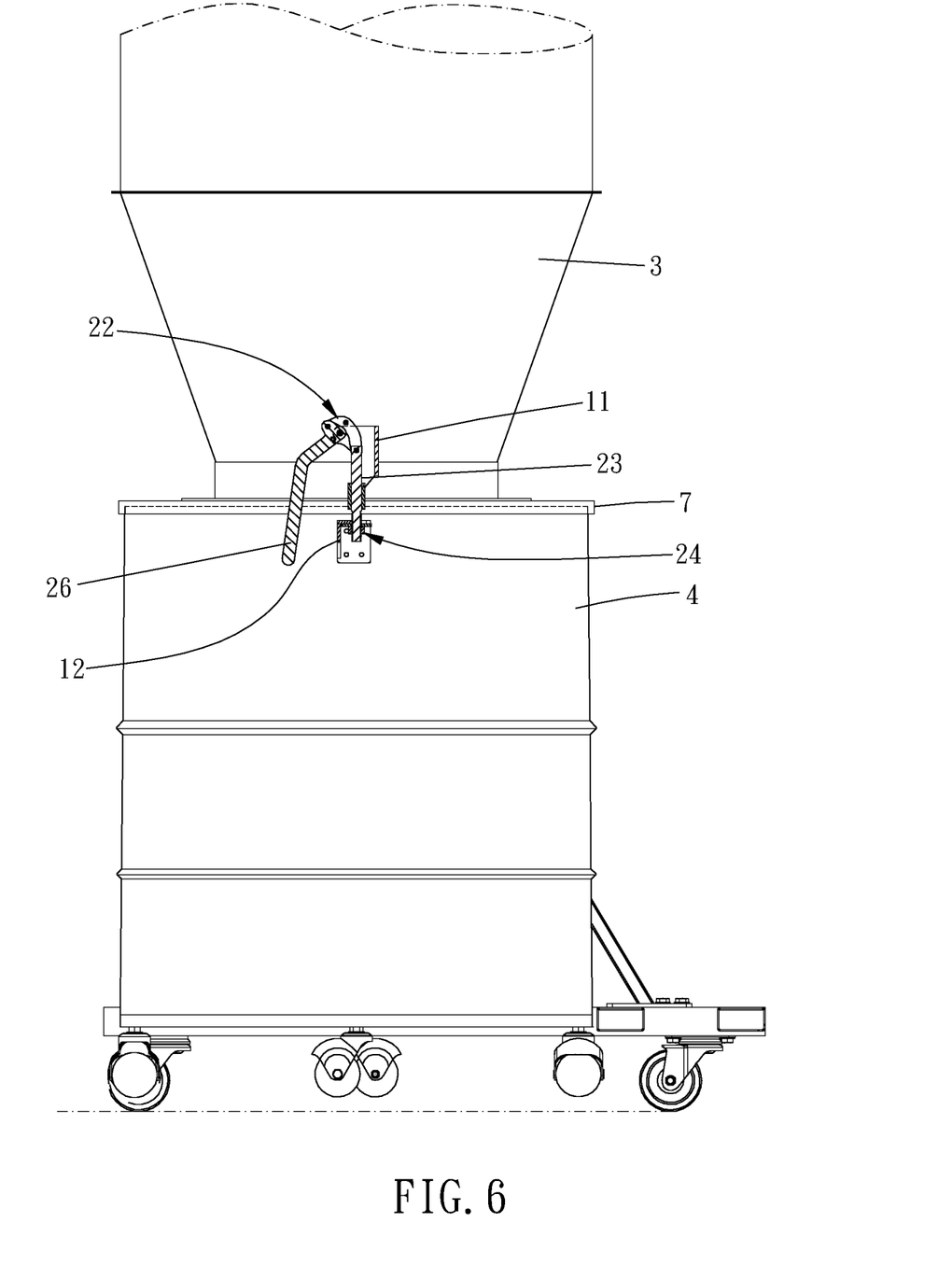
FIG. 6 is a partial cross-sectional view of a preferable embodiment of the present invention.
Figure 7:
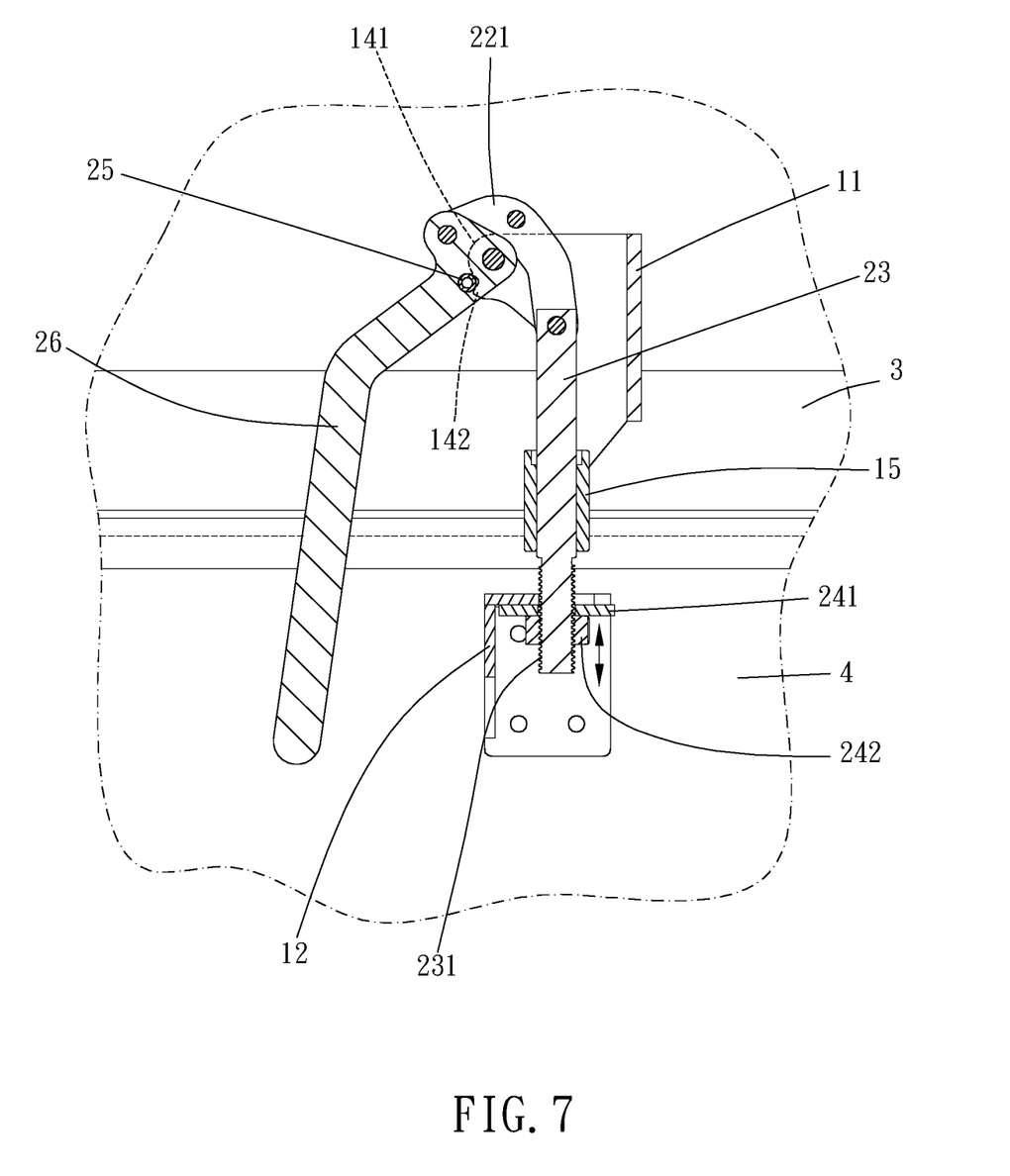
FIG. 7 is a partial enlargement of FIG. 6.
Figure 8:
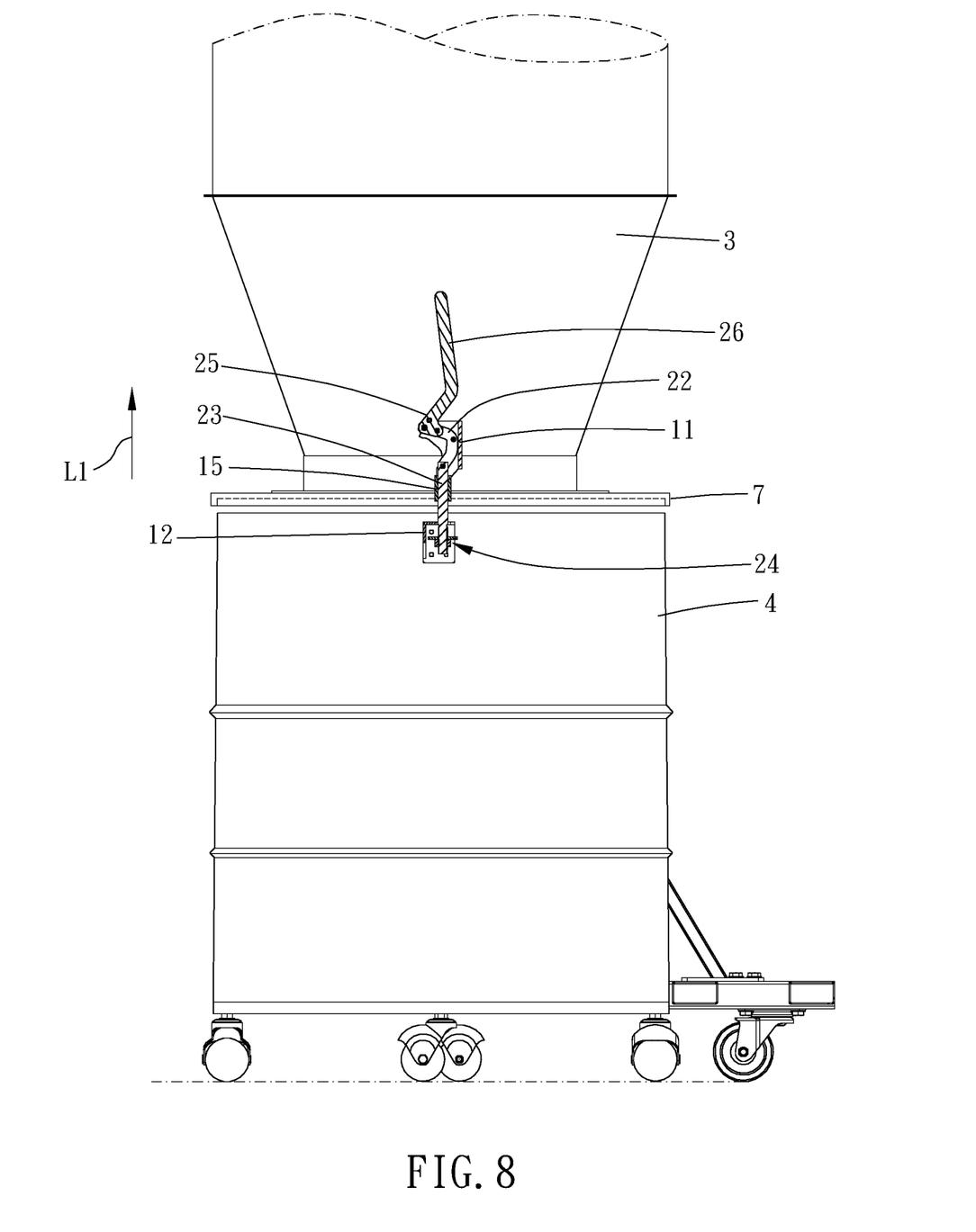
FIG. 8 is another partial cross-sectional view of a preferable embodiment of the present invention.
Figure 9:
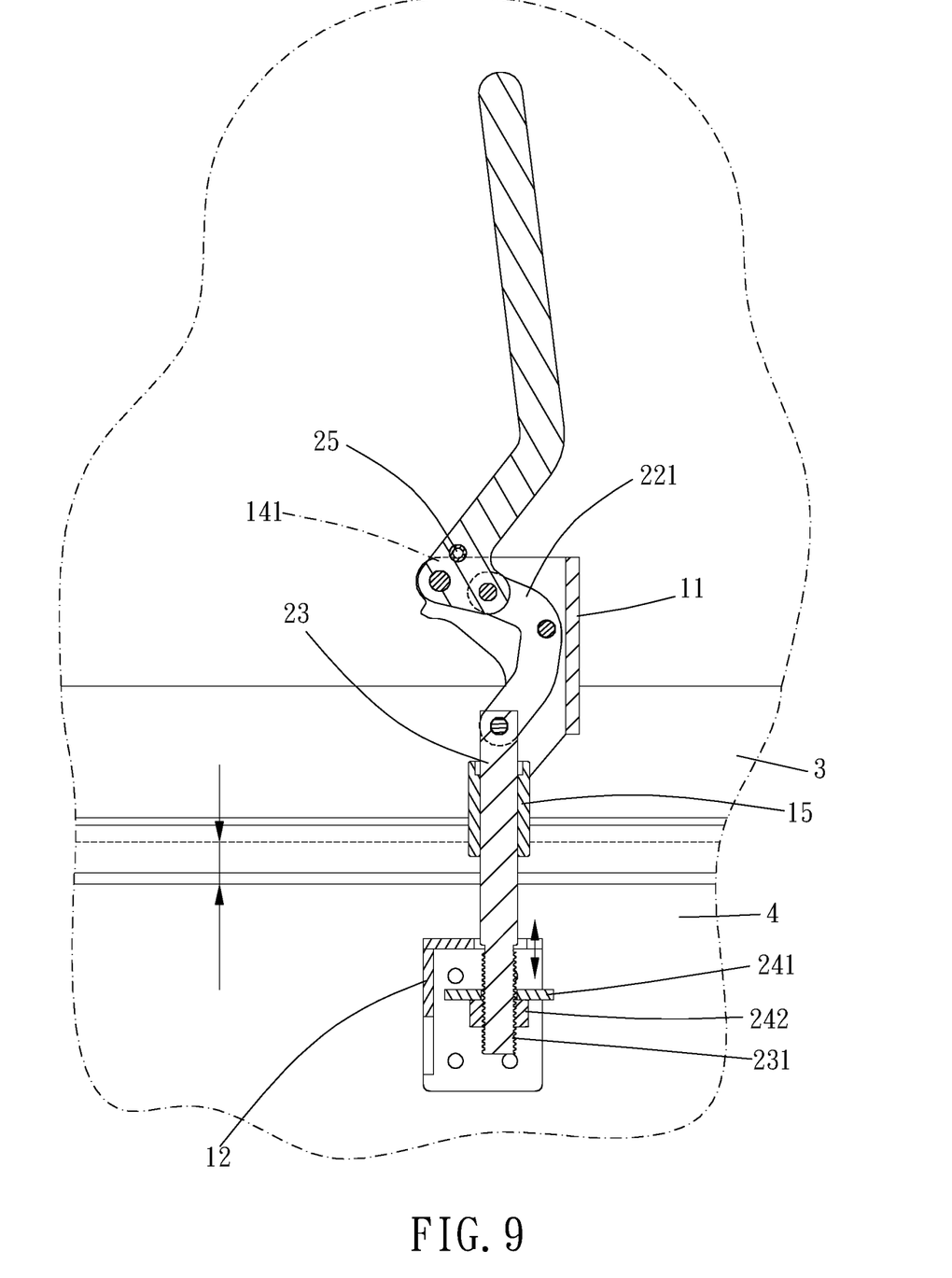
FIG. 9 is a partial enlargement of FIG. 8.
Figure 10:
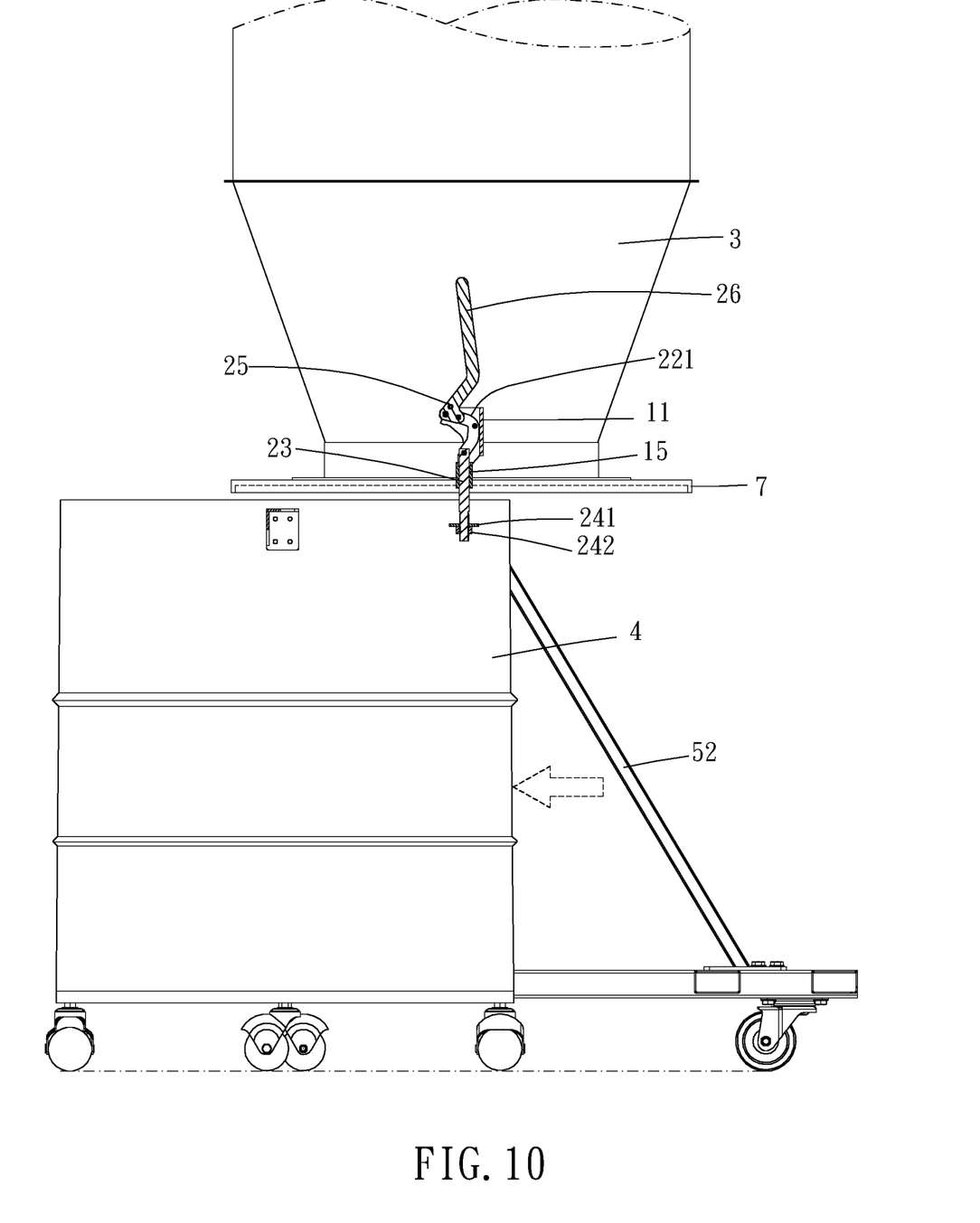
FIG. 10 is a view showing relative movement of a barrel and a cover according to a preferable embodiment of the present invention.

Please refer to FIGS. 1 to 10 for a preferable embodiment of the present invention. A disassembly mechanism is provided. The disassembly mechanism is configured to be disposed on a dust collector 2. The dust collector 2 includes a main body 3, a barrel 4 and a base 5, the main body 3 is configured to be disposed on the base 5, the main body 3 includes a suction device 6 and a cover 7, and the suction device 6 is configured to suck air into the main body 3. The cover 7 is configured to close the barrel 4 and be in communication with the main body 3, and the barrel 4 and the cover 7 are arranged on a first direction L1. The disassembly mechanism 1 includes a fixation assembly 10 and an actuating mechanism 20.

The fixation assembly 10 includes a first fixation portion 11 and a second fixation portion 12. One of the first fixation portion 11 and the second fixation portion 12 is configured to be disposed on the base 5, and the other of the first fixation portion 11 and the second fixation portion 12 is configured to be disposed on the barrel 4. In this embodiment, the first fixation portion 11 is configured to be disposed on the base 5, and the second fixation portion 12 is configured to be disposed on the barrel 4. The second fixation portion 12 includes a slot 13 which is open laterally and is U-shaped, and the slot 13 is open in a radial direction of the barrel 4. That is, the slot 13 extends lateral to the first direction L1. The actuating mechanism 20 includes an engaging portion 21 and a connecting portion 22 connected with the engaging portion 21, the engaging portion 21 is disengageably engaged laterally with the slot 13, and the connecting portion 22 is movably disposed on the first fixation portion 11 so that the engaging portion 21 is movable with the second fixation portion 12 in the first direction L1, for quick assembling.

Specifically, as the engaging portion 21 is engaged laterally with the slot 13, the barrel 4 corresponds to the cover 7, and the actuating mechanism 20 is operated so that the engaging portion 21 drives the second fixation portion 12 to move the barrel 4 toward the cover 7 for closing the barrel 4. As the actuating mechanism 20 is operated is an opposite direction, the barrel 4 is moved away from the cover 7 and the slot 13 and the engaging portion 21 are disengaged from each other.

The engaging portion 21 includes a rod body 23 and an engaging member 24, disposed on the rod body 23, the rod body 23 extends the first direction L1, and the rod body 23 is disengageably engaged with the slot 13. An outer diametric dimension of the engaging member 24 is larger than an inner diametric dimension of the slot 13, and the engaging member 24 is disengageably engaged with the second fixation portion 12, which facilitates quick assembling/disassembling of the engaging portion 21 and the slot 13, preferably, the rod body 23 includes a thread section 231, and the engaging member 24 is screwed with the thread section 231. In this embodiment, the engaging member 24 includes a large diameter section 241 and a small diameter section 242, the large diameter section 241 is disposed between the small diameter section 242 and the second fixation portion 12, and the small diameter section 242 is polygonal (such as a hexagonal nut), which providing connection for a hand tool and preventing movement of the hand tool up to the large diameter section 241. The large diameter section 241 and the small diameter section 242 are separately arranged, and the large diameter section 241 is annular (such as a ring plate) and includes a through hole 243 disposed through the rod body 23. In this embodiment, the thread section 231 is disposed within the through hole 243. Through relative movement of the small diameter section 242 and the thread section 231, the large diameter section 241 is driven to change its position relative to the rod body 23 and the slot 13, which provides fine adjustment.

The second fixation portion 12 is L-shaped and includes a base portion 121 and a lateral portion 122 lateral to the base portion 121, the base portion 121 is configured to be connected with the barrel 4, and the lateral portion 122 includes the slot 13.

The actuating mechanism 20 further includes a limiting portion 25, the first fixation portion 11 includes a guide face 141, the limiting portion 25 is disposed on the connecting portion 22, the limiting portion 25 is abutted against the guide face 141, and as the connecting portion 22 moves relative to the first fixation portion 11, the limiting portion 25 moves along the guide face 141. As a result, during the movement (pivoting, rotation or swinging, for example) of the actuating mechanism 20 relative to the first fixation portion 11, the limiting portion 25 can move along the guide face 141, and thus the operation is stable.

In this embodiment, the first fixation portion 11 includes two ears 14 and a sleeve member 15 connected with the two ears 14, the rod body 23 is disposed through the sleeve member 15, and each of the two ears 14 includes one said guide face 141. Each said guide face 141 includes a recess 142 extends radially so that the rod body 23 can be moved stably. The limiting portion 25 is disposed on the operation portion 26 and abutted against each said guide face 141, the limiting portion 25 is disengageably engaged within each said recess 142, and the limiting portion 25 is rod-shaped. The limiting portion 25 can be engaged within or disengaged from each said recess 142 easily.

The actuating mechanism 20 further includes an operation portion 26, the connecting portion 22 includes two arms 221, the operation portion 26 is rotatably connected between the two ears 14, the operation portion 26 and the engaging portion 21 are rotatably connected to the two arms 221 respectively, and the operation portion 26 is disposed between the two arms 221.

A dust collector is further provided. The dust collector includes two said disassembly mechanisms, and the dust collector 2 further includes the base 5, the main body 3 and the barrel 4.

The base 5 includes two posts 51 arranged in interval, and each said post 51 extends in the first direction L1. The two posts 51 are connected to two opposite sides of the main body 3. The main body 3 includes the suction device 6 and the cover 7. The two said disassembly mechanisms 1 are located at two opposite sides of the barrel 4, each said first fixation portion 11 is disengageably connected to one said post 51, which has a simple structure.

Preferably, the base 5 further includes two supports 52, each of the two supports 52 is laterally connected to one said post 51 and configured to be rested on a supporting surface (the ground or a face of an object).

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A dust collector, including
two disassembly mechanisms, each of the two disassembly mechanism, configured to be disposed on a dust collector, the dust collector including a main body, a barrel and a base, the main body including a suction device and a cover, the suction device being configured to suck air into the main body, the cover being configured to close the barrel and be in communication with the main body, the barrel and the cover being arranged on a first direction, each of the two disassembly mechanism including:
a fixation assembly, including a first fixation portion and a second fixation portion, one of the first fixation portion and the second fixation portion being configured to be disposed on the base, the other of the first fixation portion and the second fixation portion being configured to be disposed on the barrel, the second fixation portion including a slot which is open laterally;
an actuating mechanism, including an engaging portion and a connecting portion connected with the engaging portion, the engaging portion being disengageably engaged laterally with the slot, the connecting portion being movably disposed on the first fixation portion so that the engaging portion is movable with the second fixation portion in the first direction;
wherein the engaging portion includes a rod body and an engaging member disposed on the rod body, the rod body extends in the first direction, the rod body is disengageably engaged with the slot, an outer diametric dimension of the engaging member is larger than an inner diametric dimension of the slot, and the engaging member is disengageably engaged with the second fixation portion, wherein the engaging member includes a large diameter section and a small diameter section, the large diameter section is disposed between the small diameter section and the second fixation portion, and the small diameter section is polygonal, wherein the large diameter section and the small diameter section are separately arranged, and the large diameter section is annular and includes a through hole for insertion of the rod body, wherein the second fixation portion is L-shaped and includes a base portion and a lateral portion lateral to the base portion, the base portion is configured to be connected with the barrel, and the lateral portion includes the slot, wherein the actuating mechanism further includes a limiting portion, the first fixation portion includes a guide face, the limiting portion is disposed on the connecting portion, the limiting portion is abutted against the guide face, and as the connecting portion moves relative to the first fixation portion, the limiting portion moves along the guide face, wherein the rod body includes a thread section, the engaging member is screwed with the thread section; the actuating mechanism further includes a limiting portion, the first fixation portion includes a guide face, the limiting portion is disposed on the connecting portion, the limiting portion is abutted against the guide face, and as the connecting portion moves relative to the first fixation portion, the limiting portion moves along the guide face; the first fixation portion is configured to be disposed on the base, the second fixation portion is configured to be disposed on the barrel; the first fixation portion includes two ears and a sleeve member connected with the two ears, each of the two ears includes one said guide face; each said guide face includes a recess extends radially; the actuating mechanism further includes an operation portion, the connecting portion includes two arms, the operation portion is rotatably connected between the two ears, the operation portion and the engaging portion is rotatably connected with the two arms, the operation portion is disposed between the two arms, the limiting portion is disposed on the operation portion and abutted against each said guide face, the limiting portion is disengageably engaged within each said recess; the rod body is disposed through the sleeve member; and the limiting portion is rod-shaped;

the dust collector further including:

a base, including two posts arranged in interval, each said post extending in the first direction;

a main body, the two posts being connected to two opposite sides of the main body, the main body including a suction device and a cover, the suction device being configured to suck air into the main body;

a barrel, the barrel and the cover being arranged on the first direction, the cover being configured to close the barrel and be in communication with the main body;

wherein the two said disassembly mechanisms are located at two opposite sides of the barrel, each said first fixation portion being disengageably connected to one said post;

wherein the base further includes two supports, each of the two supports is laterally connected to one said post and configured to be rested on a supporting surface.

2. The disassembly mechanism of claim 1, wherein the slot is disposed through the second fixation portion in the first direction, and the slot is U-shaped.

* * * * *